US009502716B2

(12) United States Patent
Co et al.

(10) Patent No.: US 9,502,716 B2
(45) Date of Patent: Nov. 22, 2016

(54) ROBUST PLATINUM-COPPER CATALYSTS

(71) Applicant: Ohio State Innovation Foundation, Columbus, OH (US)

(72) Inventors: Anne Co, Columbus, OH (US); Eric Coleman, Columbus, OH (US)

(73) Assignee: Ohio State Innovation Foundation, Columbus, OH (US)

(*) Notice: Subject to any disclaimer, the term of this patent is extended or adjusted under 35 U.S.C. 154(b) by 3 days.

(21) Appl. No.: 14/084,053

(22) Filed: Nov. 19, 2013

(65) Prior Publication Data

US 2014/0147756 A1    May 29, 2014

Related U.S. Application Data

(60) Provisional application No. 61/727,887, filed on Nov. 19, 2012.

(51) Int. Cl.
| | | |
|---|---|---|
| *H01M 4/86* | (2006.01) | |
| *H01M 4/92* | (2006.01) | |
| H01M 12/04 | (2006.01) | |
| H01M 12/08 | (2006.01) | |
| H01M 8/10 | (2016.01) | |

(52) U.S. Cl.
CPC .......... *H01M 4/8657* (2013.01); *H01M 4/921* (2013.01); *H01M 4/926* (2013.01); *H01M 12/04* (2013.01); *H01M 12/08* (2013.01); *H01M 2008/1095* (2013.01); *Y02E 60/50* (2013.01)

(58) Field of Classification Search
None
See application file for complete search history.

(56) References Cited

U.S. PATENT DOCUMENTS

| | | | | |
|---|---|---|---|---|
| 2002/0015878 A1* | 2/2002 | Tsumura | ............... | H01M 4/885 429/484 |
| 2004/0106515 A1* | 6/2004 | Komura | ............. | H01M 8/1004 502/159 |
| 2011/0177937 A1* | 7/2011 | Hwang | ............... | B01J 31/1805 502/167 |

FOREIGN PATENT DOCUMENTS

WO    WO2011099956    *    8/2011

OTHER PUBLICATIONS

Xu, Caixia et al., "Fabrication of Nanoporous Cu—Pt(Pd) Core/Shell Structure by Galvanic Replacement and Its Application in Electrocatalysis," ACS Applied Materials & Interfaces, (2011) 3:4626-4632.

(Continued)

*Primary Examiner* — Patrick Ryan
*Assistant Examiner* — Wyatt McConnell
(74) *Attorney, Agent, or Firm* — Meunier Carlin & Curfman LLC

(57) ABSTRACT

Highly active and stable platinum-copper (PtCu) electrocatalysts are provided. The PtCu catalysts can be in the form of discrete, spherical PtCu nanoparticles that include a particle interior comprising platinum and copper, and a surface layer comprising platinum surrounding the particle interior. The PtCu nanoparticles can exhibit enhanced oxygen reduction reaction (ORR) activity as compared to other Pt-based catalysts for ORR. The PtCu nanoparticles are also active as electrocatalysts for the oxidation of small molecule organic compounds, including alcohols such as methanol and ethanol.

12 Claims, 8 Drawing Sheets

(56) References Cited

OTHER PUBLICATIONS

Niu, Xiangheng et al., "Well-Dispersed Pt Cubes on Porous Cu Foam: High-Performance Catalysts for the Electrochemical Oxidation of Glucose in Neutral Media," Chemistry A European Journal, (2013) 19:9534-9541.

Xu, Caixia et al., "Nanotubular Mesoporous Bimetallic Nanostructures With Enhanced Electrocatalytic Performance," Advanced Materials, (2009) 21:2165-2169.

Koh, Shirlaine et al., "Electrocatalysis on Bimetallic Surfaces: Modifying Catalytic Reactivity for Oxygen Reduction by Voltammetric Surface Dealloying," J. American Chemical Society, (2007) 129:12624-12625.

Strasser et al., "Lattice-strain control of the activity in dealloyed core-shell fuel cell catalysts", Nature Chemistry, vol. 2, pp. 454-460, Jun. 2010.

* cited by examiner

ROBUST PLATINUM-COPPER CATALYSTS

CROSS-REFERENCE TO RELATED APPLICATIONS

This application claims benefit of U.S. Provisional Application No. 61/727,887, filed Nov. 19, 2012, which is hereby incorporated herein by reference in its entirety.

TECHNICAL FIELD

This application relates generally to PtCu catalysts, as well as methods of making and using thereof.

BACKGROUND

Proton exchange membrane fuel cells, also known as polymer electrolyte membrane (PEM) fuel cells (PEMFC), are energy conversion devices in which hydrogen or another hydrocarbon fuel is supplied to the anode of the fuel cell and oxygen is supplied as oxidant to the cathode.

In hydrogen oxygen PEMFCs (PEMFCs in which hydrogen is supplied to the anode of the fuel cell and oxygen is supplied to the cathode of fuel cell) comprise a membrane electrode assembly (MEA) consisting of a proton conducting polymer membrane functioning as the electrolyte which separates an anode from a cathode. Hydrogen is introduced at the anode where it comes into contact with a catalyst, causing dissociation of the hydrogen into constituent protons and electrons. This oxidation half-cell reaction or Hydrogen Oxidation Reaction (HOR) is represented by Eq. 1 below.

$$H_2 \rightarrow 2H^+ + 2e^- \tag{Eq.1}$$

Once formed, the protons pass from the anode through the polymer electrolyte membrane to the cathode. The transport process of the protons across the polymer electrolyte membrane is facilitated by interactions of the protons with one another as well as with the water molecules (which is the by-product of the electrochemical reaction in the fuel cell) in the MEA. However, the electrons cannot pass through the polymer electrolyte membrane and instead traverse an external circuit that connects the anode to the cathode, thus generating the current output of the fuel cell.

Meanwhile, a stream of oxygen is delivered to the cathode of the MEA. At the cathode, oxygen molecules react with the protons permeating through the polymer electrolyte membrane and the electrons arriving through the external circuit to form water molecules. This reduction half-cell reaction or oxygen reduction reaction (ORR) is represented by Eq. 2 below.

$$\tfrac{1}{2}O_2 + 2H^+ + 2e^- \rightarrow H_2O \tag{Eq. 2}$$

The overall reaction in the hydrogen oxygen PEMFC is represented in Eq. 3 below.

$$H_2 + \tfrac{1}{2}O_2 \rightarrow H_2O \tag{Eq. 3}$$

PEMFCs require active and stable catalysts at both at the anode and at the cathode where the fuel oxidation and oxygen reduction reactions occur, respectively. The catalysts are needed to speed up the rates of the electrochemical reactions, which are particularly sluggish on the cathodic side of the fuel cell device. The rate of the oxygen reduction reaction is approximately $10^2$-$10^3$ times lower than the rate of the anodic reaction. Currently, PEMFCs use platinum catalysts such as carbon-supported platinum and platinum-transition metal alloy catalysts. However, improved catalysts, particularly improved catalysts for the ORR, that are less expensive, exhibit improved stability, and/or exhibit sustained or improved activity are needed to develop commercially viable fuel cells.

SUMMARY

Provided herein are platinum-copper (PtCu) catalysts, including PtCu nanoparticles, that can exhibit improved stability and/or exhibit sustained or improved catalytic activity. The PtCu nanoparticles can comprise a particle interior comprising platinum and copper, and a surface layer comprising platinum surrounding the particle interior. The PtCu nanoparticles can have an average particle size of from 10 nm to 500 nm, as determined by scanning electron microscopy (SEM).

The PtCu nanoparticles can be prepared by a process that comprises galvanically depositing a catalytically effective amount of platinum on a porous copper support at a temperature greater than 5° C. to form a PtCu precursor catalyst, and conditioning the PtCu precursor catalyst to form a population of PtCu nanoparticles. This process can further comprise additional processing steps, including forming the porous copper support used as a substrate for galvanic deposition.

The shape, size, composition, and catalytic activity of the PtCu nanoparticles can be readily tuned by varying process parameters during catalyst formation, including the nature of the porous copper support used as a substrate for galvanic deposition, and the conditions under which galvanic deposition is performed (e.g., the temperature during galvanic deposition, the duration of the galvanic deposition reaction, and/or the concentration of the Pt-containing species that reacts with the porous copper support during the course of galvanic deposition, as discussed in more detail below). In some embodiments, the PtCu nanoparticles can exhibit a Pt electrochemical surface area per unit Pt mass ranging from 10 m² Pt/g Pt to 30 m² Pt/g Pt (e.g., from 10 m² Pt/g Pt to 25 m² Pt/g Pt). In certain embodiments, the molar ratio of Pt:Cu in the PtCu nanoparticles, as determined by Inductively Coupled Plasma-Mass Spectroscopy (ICP-MS), can range from 0.5:1 to 3:1 (e.g., from 1:1 to 2.5:1).

The PtCu nanoparticles can exhibit enhanced oxygen reduction reaction (ORR) activity as compared to other Pt-based catalysts for ORR. In some embodiments, the PtCu nanoparticles can exhibit an $O_2$ reduction ICP-MS-determined, IR-corrected, mass activity at 0.9 $V_{RHE}$ (measured at 25° C. and 100 kPa $O_2$ in 0.1 M $HClO_4$) of from 0.2 A/mg Pt to 0.45 A/mg Pt. In some embodiments, the PtCu nanoparticles can exhibit an $O_2$ reduction Pt-surface area-based, IR-corrected, specific activity at 0.9 $V_{RHE}$ (measured at 25° C. and 100 kPa $O_2$ in 0.1 M $HClO_4$) of from 750 µA/cm² Pt to 2500 µA/cm² Pt. The PtCu nanoparticles can also exhibit significant stability over the course of numerous reaction cycles. For example, in some embodiments, the PtCu nanoparticles can exhibit less than a 30% reduction in Pt electrochemical surface area following 10,000 cycles between a potential of 0.6 and 1.1 $V_{RHE}$ in $O_2$-saturated 0.1 M $HClO_4$ at 25° C. In some embodiments, the PtCu nanoparticles can exhibit less than a 50% reduction in $O_2$ reduction ICP-MS-determined, IR-corrected, mass activity at 0.9 $V_{RHE}$, measured at 25° C. and 100 kPa $O_2$, following 10,000 cycles between a potential of 0.6 and 1.1 $V_{RHE}$ in $O_2$-saturated 0.1 M $HClO_4$ at 25° C. The PtCu nanoparticles can also catalyze the oxidation of small molecule organic compounds, including alcohols such as methanol and ethanol.

The PtCu catalysts described herein can be employed as catalysts at the anode, the cathode, or both the anode and the cathode of PEMFCs. The PtCu catalysts described herein can also be employed as catalysts at the cathode of metal air batteries (e.g., Li-air batteries).

DESCRIPTION OF DRAWINGS

FIG. 2C) and gravimetric surface area (in m$^2$ Pt/g Pt; FIG. 2D) of three different PtCu catalysts measured from the $H_{UPD}$ region after double layer correction using 210 μC/cm$^2$ Pt conversion factor. Pt loading was measured by ICP-MS. Electrochemical measurements were performed in $N_2$-saturated 0.1 M $HClO_4$ at 25° C.; 100 mV/s.

FIG. 5A is a plot of the electrochemically accessible Pt area of the PtCu catalysts as a function of duration of cycling (number of cycles). FIG. 5B is a plot of the relative specific activity of the PtCu catalysts as a function of duration of cycling (number of cycles).

DETAILED DESCRIPTION

General Definitions

Figure 1:
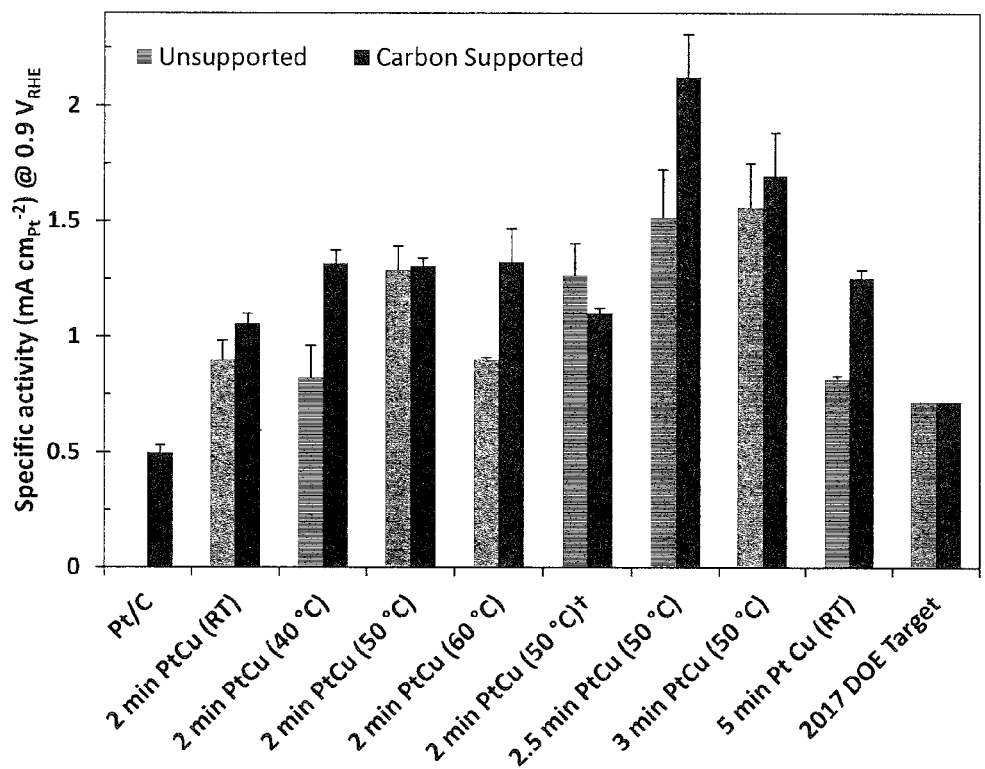
FIG. 1 is a plot of the oxygen reduction activity (specific activity in mA cm$^{-2}$, corrected for internal resistance (IR-corrected)) at 0.9 V versus a reversible hydrogen electrode (RHE) of PtCu catalysts prepared under varying conditions normalized to Pt electrochemical surface area. Activities were measured for the anodic sweeps at 298 K, 1600 rpm, and 100 mV/s in oxygen saturated 0.1 M $HClO_4$. Values for Pt on carbon (20 wt % Pt/C; obtained commercially from Johnson Matthey) as well as the target values established by the U.S. Department of Energy are included for reference. † indicates a PtCu catalyst prepared using 1/10 of the standard concentration of $K_2PtCl_4$ during Pt galvanic displacement.

"Monodisperse" and "homogeneous size distribution," as used herein, and generally describe a population of particles where all of the particles are the same or nearly the same size. As used herein, a monodisperse distribution refers to particle distributions in which 80% of the distribution (e.g., 85% of the distribution, 90% of the distribution, or 95% of the distribution) lies within 25% of the median particle size (e.g., within 20% of the median particle size, within 15% of the median particle size, within 10% of the median particle size, or within 5% of the median particle size).

"Mean particle size" or "average particle size", are used interchangeably herein, and generally refer to the statistical mean particle size of the particles in a population of nanoparticles. The diameter of an essentially spherical particle can refer to the physical diameter of the spherical particle. The diameter of a non-spherical nanoparticle can refer to the largest linear distance between two points on the surface of the nanoparticle. Mean particle size can be measured using methods known in the art, such as evaluation by scanning electron microscopy.

PtCu Nanoparticles

Provided herein are platinum-copper (PtCu) catalysts, including PtCu nanoparticles. The PtCu nanoparticles can comprise a particle interior comprising platinum and copper, and a surface layer comprising platinum surrounding the particle interior. The PtCu nanoparticles can be prepared by a process that comprises galvanically depositing a catalytically effective amount of platinum on a porous copper support at a temperature greater than 5° C. to form a PtCu precursor catalyst, and conditioning the PtCu precursor catalyst to form a population of PtCu nanoparticles. This process can further comprise additional processing steps, as described in more detail below, including forming the porous copper support used as a substrate for galvanic deposition.

The shape, size, and composition of the PtCu nanoparticles can be varied based on a number of factors, including the nature of the porous copper support used as a substrate for galvanic deposition, and the conditions under which galvanic deposition is performed (e.g., the temperature during galvanic deposition, the duration of the galvanic deposition, the concentration of the Pt-containing species that reacts with the porous copper support during the course of galvanic deposition, etc. as discussed in more detail below). The nanoparticles formed by the process can be spherical or non-spherical in shape. In certain embodiments, the PtCu nanoparticles can be discrete, spherical nanoparticles. In some embodiments, the population of PtCu nanoparticles formed by this process is monodisperse. The PtCu nanoparticles can optionally comprise nanopores. In some embodiments, the nanopores can interconnect, so as to form a network of nanopores spanning the PtCu nanoparticles.

In some embodiments, the PtCu nanoparticles can have an average particle size, as measured by scanning electron microscopy (SEM), of at least 10 nm (e.g., at least 15 nm, at least 20 nm, at least 25 nm, at least 30 nm, at least 35 nm, at least 40 nm, at least 45 nm, at least 50 nm, at least 55 nm, at least 60 nm, at least 65 nm, at least 70 nm, at least 75 nm, at least 80 nm, at least 85 nm, at least 90 nm, at least 95 nm, at least 100 nm, at least 150 nm, at least 200 nm, at least 250 nm, at least 300 nm, at least 350 nm, at least 400 nm, or at least 450 nm). In some embodiments, the PtCu nanoparticles can have an average particle size, as measured by SEM, of 500 nm or less (e.g., 450 nm or less, 400 nm or less, 350 nm or less, 300 nm or less, 250 nm or less, 200 nm or less, 150 nm or less, 100 nm or less, 95 nm or less, 90 nm or less, 85 nm or less, 80 nm or less, 75 nm or less, 70 nm or less, 65 nm or less, 60 nm or less, 55 nm or less, 50 nm or less, 45 nm or less, 40 nm or less, 35 nm or less, 30 nm or less, 25 nm or less, 20 nm or less, or 15 nm or less).

The PtCu nanoparticles can have an average particle size, as measured by SEM, ranging from any of the minimum values described above to any of the maximum values described above. For example, the PtCu nanoparticles can have an average particle size, as measured by SEM, of from 10 nm to 500 nm (e.g., from 10 nm to 150 nm, from 10 nm to 80 nm, from 25 nm to 80 nm, or from 50 nm to 80 nm).

The molar ratio of Pt:Cu in the PtCu nanoparticles can be determined by Inductively Coupled Plasma-Mass Spectroscopy (ICP-MS). In some embodiments, molar ratio of Pt:Cu in the PtCu nanoparticles can be at least 0.5:1 (e.g., at least 1:1, at least 1.25:1, at least 1.5:1, at least 1.6:1, at least 1.7:1, at least 1.8:1, at least 1.9:1, at least 2:1, at least 2.1:1, at least 2.2:1, at least 2.3:1, at least 2.4:1, or at least 2.5:1). In some embodiments, molar ratio of Pt:Cu in the PtCu nanoparticles can be 3:1 or less (e.g., 2.5:1 or less, 2.4:1 or less, 2.3:1 or less, 2.2:1 or less, 2.1:1 or less, 2:1 or less, 1.9:1 or less, 1.8:1 or less, 1.7:1 or less, 1.6:1 or less, 1.5:1 or less, 1.25:1 or less, or 1:1 or less).

The molar ratio of Pt:Cu in the PtCu nanoparticles can range from any of the minimum ratios described above to any of the maximum ratios described above. For example, the molar ratio of Pt:Cu in the PtCu nanoparticles, as determined by ICP-MS, can range from 0.5:1 to 3:1 (e.g., from 0.5:1 to 2.5:1, from 1:1 to 2.5:1, or from 1.5:1 to 2.2:1).

As described above, the PtCu nanoparticles can comprise a particle interior comprising platinum and copper, and a surface layer comprising platinum surrounding the particle interior. In some embodiments, the particle interior can be substantially homogenous. In these embodiments, the molar ratio of Pt:Cu in the particle interior, as measured at points throughout particle interior using a transmission electron microscope (e.g., energy-dispersive X-ray spectroscopy), varies by 10% or less throughout the particle interior. The surface layer surrounding the particle interior comprises an active surface comprising platinum, as evidenced by electrochemical cyclic voltammetry (CV). In some embodiments, the surface layer can have a thickness of less than 10 nm (e.g., less than 5 nm, less than 3 nm, less than 2 nm, or less than 1 nm). The surface layer can further comprise copper. In certain embodiments, the molar ratio of Pt:Cu in the surface layer, as measured at points throughout the surface layer using a transmission electron microscope (e.g., energy-dispersive X-ray spectroscopy), varies by 10% or less from the molar ratio of Pt:Cu in the particle interior. In other embodiments, the molar ratio of Pt:Cu in the surface layer, as measured at points throughout the surface layer using a transmission electron microscope (e.g., energy-dispersive X-ray spectroscopy), can be at least 10% higher than the molar ratio of Pt:Cu in the particle interior (i.e., the surface layer is enriched in platinum relative to the particle interior). In one embodiment, the surface layer comprises an active surface consisting essentially of platinum (i.e., analysis by CV exclusively shows peaks characteristic of platinum on the surface of the nanoparticles).

The platinum electrochemical surface area (Pt ECSA) of the PtCu nanoparticles can be measured using standard methods known in the art. For example, the Pt ECSA can be calculated from a $N_2$-saturated voltammogram via the average integrated charge of the underpotentially deposited hydrogen ($H_{upd}$) region of the voltammogram (0.05 V to 0.40 V) after double-layer correction, using the characteristic value of charge density associated with a monolayer of hydrogen adsorbed on a polycrystalline platinum surface (210 $\mu C/cm^2$ Pt). In some embodiments, the PtCu nanoparticles can exhibit a Pt electrochemical surface area per unit Pt mass of at least 10 $m^2$ Pt/g Pt (e.g., at least 15 $m^2$ Pt/g Pt, at least 20 $m^2$ Pt/g Pt, or at least 25 $m^2$ Pt/g Pt). In some embodiments, the PtCu nanoparticles can exhibit a Pt electrochemical surface area per unit Pt mass of 30 $m^2$ Pt/g Pt or less (e.g., 25 $m^2$ Pt/g Pt or less, 20 $m^2$ Pt/g Pt or less, or 15 $m^2$ Pt/g Pt or less).

The PtCu nanoparticles can exhibit a Pt electrochemical surface area per unit Pt mass ranging from any of the minimum values described above to any of the maximum values described above. For example, the PtCu nanoparticles can exhibit a Pt electrochemical surface area per unit Pt mass ranging from 10 $m^2$ Pt/g Pt to 30 $m^2$ Pt/g Pt (e.g., from 10 $m^2$ Pt/g Pt to 25 $m^2$ Pt/g Pt).

The PtCu nanoparticles can exhibit activity as oxygen reduction reaction (ORR) catalysts. The ORR activity of the PtCu nanoparticles can vary based on the composition and morphology of the nanoparticles. In some embodiments, the PtCu nanoparticles can exhibit an $O_2$ reduction ICP-MS-determined, internal resistance-corrected (IR-corrected), mass activity at 0.9 $V_{RHE}$ of at least 0.2 A/mg Pt, measured at 25° C. and 100 kPa $O_2$ in 0.1 M $HClO_4$ (e.g., at least 0.25 A/mg Pt, at least 0.3 A/mg Pt, at least 0.35 A/mg Pt, or at least 0.4 A/mg Pt). In some embodiments, the PtCu nanoparticles can exhibit an $O_2$ reduction ICP-MS-determined, IR-corrected, mass activity at 0.9 $V_{RHE}$ of 0.45 A/mg Pt or less, measured at 25° C. and 100 kPa $O_2$ in 0.1 M $HClO_4$ (e.g., 0.4 A/mg Pt or less, 0.35 A/mg Pt or less, 0.3 A/mg Pt or less, or 0.25 A/mg Pt or less).

The PtCu nanoparticles can exhibit an $O_2$ reduction mass activity ranging from any of the minimum values described above to any of the maximum values described above. For example, the PtCu nanoparticles can exhibit an $O_2$ reduction ICP-MS-determined, IR-corrected, mass activity at 0.9 $V_{RHE}$ of from 0.2 A/mg Pt to 0.45 A/mg Pt, measured at 25° C. and 100 kPa $O_2$ in 0.1 M $HClO_4$ (e.g., from 0.2 A/mg Pt to 0.3 A/mg Pt).

In some embodiments, the PtCu nanoparticles can exhibit an $O_2$ reduction Pt-surface area-based, IR-corrected, specific activity at 0.9 $V_{RHE}$ of at least 750 µA/cm² Pt, measured at 25° C. and 100 kPa $O_2$ in 0.1 M $HClO_4$ (e.g., at least 1000 µA/cm² Pt, at least 1500 µA/cm² Pt, or at least 2000 µA/cm² Pt). In some embodiments, the PtCu nanoparticles can exhibit an $O_2$ reduction Pt-surface area-based, IR-corrected, specific activity at 0.9 $V_{RHE}$ of 2500 µA/cm² Pt or less, measured at 25° C. and 100 kPa $O_2$ in 0.1 M $HClO_4$ (e.g., 2000 µA/cm² Pt or less, 1500 µA/cm² Pt or less, or 1000 µA/cm² Pt or less).

The PtCu nanoparticles can exhibit an $O_2$ reduction specific activity ranging from any of the minimum values described above to any of the maximum values described above. For example, the PtCu nanoparticles can exhibit an $O_2$ reduction Pt-surface area-based, IR-corrected, specific activity at 0.9 $V_{RHE}$ of from 750 µA/cm² Pt to 2500 µA/cm² Pt, measured at 25° C. and 100 kPa $O_2$ in 0.1 M $HClO_4$ (e.g., from 1000 µA/cm² Pt to 2500 µA/cm² Pt).

The PtCu nanoparticles can exhibit significant stability over the course of numerous reaction cycles. In some embodiments, the PtCu nanoparticles can exhibit less than a 30% reduction (e.g., less than a 25% reduction, less than a 20% reduction, less than a 15% reduction, or less than a 10% reduction) in Pt electrochemical surface area following 10,000 cycles, 25,000 cycles, or 50,000 cycles between a potential of 0.6 and 1.1 $V_{RHE}$ in $O_2$-saturated 0.1 M $HClO_4$ at 25° C. In certain embodiments, the PtCu nanoparticles can exhibit a reduction of from 30% to 10% in Pt electrochemical surface area following 10,000 cycles, 25,000 cycles, or 50,000 cycles between a potential of 0.6 and 1.1 $V_{RHE}$ in $O_2$-saturated 0.1 M $HClO_4$ at 25° C.

In some embodiments, the PtCu nanoparticles can exhibit less than a 50% reduction (e.g., less than a 45% reduction, less than a 40% reduction, less than a 30% reduction, or less than a 30% reduction) in $O_2$ reduction ICP-MS-determined, IR-corrected, mass activity at 0.9$V_{RHE}$, measured at 25° C. and 100 kPa $O_2$, following 10,000 cycles, 25,000 cycles, or 50,000 cycles between a potential of 0.6 and 1.1 $V_{RHE}$ in $O_2$-saturated 0.1 M $HClO_4$ at 25° C. In certain embodiments, the PtCu nanoparticles can exhibit a reduction of from 50% to 30% in $O_2$ reduction ICP-MS-determined, IR-corrected, mass activity at 0.9$V_{RHE}$, measured at 25° C. and 100 kPa $O_2$, following 10,000 cycles, 25,000 cycles, or 50,000 cycles between a potential of 0.6 and 1.1 $V_{RHE}$ in $O_2$-saturated 0.1 M $HClO_4$ at 25° C.

Methods of Making

Also provided are methods for producing PtCu catalysts, including the PtCu nanoparticles described above. Methods for producing PtCu catalysts can comprise galvanically depositing a catalytically effective amount of platinum on a porous copper support at a temperature greater than 5° C. to form a PtCu precursor catalyst; and conditioning the PtCu precursor catalyst to form the PtCu catalyst. Methods for producing PtCu catalysts can further comprise preparing the porous copper support used as a substrate for galvanic deposition.

The porous copper support used as a substrate for galvanic deposition can comprise a nanoporous, open-cell copper foam. Suitable porous copper support can be prepared from alloys of copper and a second, less noble metal (e.g., aluminum, zinc, magnesium, tin, etc.). The second, less noble metal can be selectively removed, for example by etching the alloy (a process also referred to as selective leaching or dealloying), to provide a porous copper material. This process can involve contacting an alloy of copper and a second, less noble metal with an etchant for a period of time effective to selectively leach the second, less noble metal from the copper and form a porous copper support. An appropriate etchant can be selected in view of the identity of the second, less noble metal. For example, in some embodiments, the porous copper support can be prepared by etching CuAl alloy (e.g., by contacting the CuAl alloy with a suitable etchant, for example a base such as aqueous sodium hydroxide, for a period of time effective to selectively leach the aluminum from the copper) to form a porous copper support.

The relative amounts of copper and the second, less noble metal in the alloy used to form the porous copper support can be varied in order to influence the properties of the resulting porous copper support (and thus the properties of the PtCu catalysts formed from the porous copper support). In some embodiments, the alloy of copper and a second, less noble metal (e.g., aluminum) can comprise at least 10 atomic percent (at %) copper (e.g., at least 15 at % copper, at least 20 at % copper, at least 25 at % copper, at least 30 at % copper, at least 35 at % copper, at least 40 at % copper, or at least 45 at % copper). In some embodiments, the alloy of copper and a second, less noble metal (e.g., aluminum) can comprise 50 at % or less copper (e.g., 45 at % or less copper, 40 at % or less copper, 35 at % or less copper, 30 at % or less copper, 25 at % or less copper, 20 at % or less copper, or 15 at % or less copper). In some embodiments, the alloy of copper and a second, less noble metal (e.g., aluminum) can comprise at least 50 at % of the second, less noble metal (e.g., at least 55 at % of the second, less noble metal, at least 60 at % of the second, less noble metal, at least 65 at % of the second, less noble metal, at least 70 at % of the second, less noble metal, at least 75 at % of the second, less noble metal, at least 80 at % of the second, less noble metal, or at least 85 at % of the second, less noble metal). In some embodiments, the alloy of copper and a second, less noble metal (e.g., aluminum) can comprise 90 at % or less of the second, less noble metal (e.g., 85 at % or less of the second, less noble metal, 80 at % or less of the second, less noble metal, 75 at % or less of the second, less noble metal, 70 at % or less of the second, less noble metal, 65 at % or less of the second, less noble metal, 60 at % or less of the second, less noble metal, or 55 at % or less of the second, less noble metal).

The relative amounts of copper and the second, less noble metal (e.g., aluminum) in the alloy (e.g., CuAl) used to form the porous copper support can range from any of the minimum values described above to any of the maximum values described above. For example, the alloy of copper and a second, less noble metal (e.g., aluminum) can comprise from 10 to 50 at % copper and from 50 to 90 at % of the second, less noble metal (e.g., Al). In certain embodiments, the alloy used to form the porous copper support can be a CuAl alloy that comprises from 10 to 50 at % copper and from 50 to 90 at % aluminum (e.g., from 10 to 30 at % copper and from 70 to 90 at % aluminum).

The specific surface area of the porous copper support can be varied to influence the properties of the resulting PtCu catalysts. In some embodiments, the porous copper support used as a substrate for galvanic deposition can have a specific surface area of at least 8 m²/g, as measured using the Brunauer-Emmett-Teller (BET) method (e.g, at least 10 m²/g, at least 15 m²/g, at least 20 m²/g, at least 25 m²/g, at least 30 m²/g, or at least 35 m²/g). In some embodiments, the porous copper support used as a substrate for galvanic deposition can have a specific surface area of 40 m²/g or less, as measured using the BET method (e.g., 35 m²/g or less, 30 m²/g or less, 25 m²/g or less, 20 m²/g or less, 15 m²/g or less, or 10 m²/g or less).

The porous copper support used as a substrate for galvanic deposition can have a specific surface area ranging from any of the minimum values described above to any of the maximum values described above. For example, the porous copper support used as a substrate for galvanic deposition can have a specific surface area of from 8 m²/g to 40 m²/g, as measured using the BET method (e.g., from 10 m²/g to 25 m²/g, from 10 m²/g to 20 m²/g, or from 10 m²/g to 15 m²/g).

A catalytically effective amount of Pt can be galvanically deposited on the porous copper support under conditions effective to form a PtCu precursor catalyst. Galvanic deposition can involve contacting the porous copper support with a solution (e.g., an aqueous solution) comprising a Pt-containing species. The Pt-containing species can comprise a platinum metal complex that can participate in a spontaneous galvanic-reaction with the copper in the porous copper support, such as $PtCl_4^{2-}$, $PtCl_6^{2-}$, or combinations thereof. In some embodiments, the porous copper support is disposed on a surface (e.g., the surface of an electrode) in contact with the solution comprising the Pt-containing species during galvanic deposition. In certain embodiments, the surface comprising the porous copper support can be rotated during galvanic deposition. The surface can be rotated at a rate effective to induce a laminar flow of the solution comprising the Pt-containing species towards and across the surface on which the porous copper support is disposed during galvanic deposition. This can drive uniform deposition of platinum on the porous carbon support. In certain embodiments, the surface can be rotated at a rate of from 250 rpm to 2000 rpm (e.g., from 250 rpm to 1500 rpm, or from 250 rpm to 750 rpm).

The galvanic deposition can be performed at varying temperatures to provide PtCu catalysts having the desired properties for a particular catalytic application. In some embodiments, the galvanic deposition can be performed at a temperature greater than 5° C. (e.g., at least 10° C., at least 15° C., at least 20° C., at least 25° C., at least 30° C., at least 35° C., at least 40° C., at least 45° C., at least 50° C., at least 55° C., at least 60° C., at least 65° C., at least 70° C., at least 75° C., at least 80° C., or at least 85° C.). In some embodiments, the galvanic deposition can be performed at a temperature of 90° C. or less (e.g., 85° C. or less, 80° C. or less, 75° C. or less, 70° C. or less, 65° C. or less, 60° C. or less, 55° C. or less, 50° C. or less, 45° C. or less, 40° C. or less, 35° C. or less, 30° C. or less, 25° C. or less, 20° C. or less, 15° C. or less, or 10° C. or less).

The galvanic deposition can be performed at a temperature ranging from any of the minimum temperature values described above to any of the maximum temperatures described above. For example, in some embodiments, the platinum is galvanically deposited at a temperature of from 5° C. to 90° C. (e.g., from 5° C. to 90° C., from 25° C. to 90° C., from 5° C. to 60° C., or from 25° C. to 60° C.). In certain embodiments, the galvanic deposition can be performed at a temperature selected to provide a population of discrete PtCu nanoparticles.

The galvanic deposition can be performed for varying periods of time, so as to provide PtCu precursor catalysts (and ultimately PtCu catalysts) having a molar ratio of Pt:Cu desired for use in a particular catalytic application. For example, porous copper support (or a surface comprising the porous copper support) can be maintained in contact with the solution comprising the Pt-containing species for a period of time effective to form a PtCu precursor catalyst that exhibits a molar ratio of from 0.5:1 to 3:1 (e.g., from 0.5:1 to 2.5:1, from 1:1 to 2.5:1, or from 1.5:1 to 2.2:1), as determined by ICP-MS.

Following galvanic deposition, the PtCu precursor catalyst can be conditioned to form the PtCu catalyst. Conditioning can involve electrochemical dealloying of the PtCu precursor catalyst to form the PtCu catalyst. For example, the PtCu precursor catalyst can be conditioned by repeated electrochemical cycling (e.g., 50 cycles) of the PtCu precursor catalyst between 0.5 V and 1.2 V at 25° C. in $N_2$-saturated 0.1 M $HClO_4$ to dealloy/stabilize the catalyst.

Applications

As described above, the PtCu catalysts described herein can be used as electrocatalysts. Accordingly, also provided herein are electrodes comprising a population of the PtCu nanoparticles described herein disposed on a conductive substrate (e.g., the surface of an electrode, such as a carbon electrode).

For some applications, including many catalytic applications, it may be of interest to deposit the PtCu nanoparticles described herein on a support, such as a carbonaceous support. Accordingly, also provided are compositions comprising a population of the PtCu nanoparticles described herein deposited on a support, such as a carbonaceous support. The carbonaceous support may comprise any type of carbon that suitably supports the PtCu nanoparticles to provide a catalyst having suitable activity. The carbonaceous support can comprise an amorphous carbon, a crystalline or graphitic carbon, or a vitreous or glassy carbon. Also, the carbonaceous support can be in any suitable form (e.g., in the form of a powder, fiber, or flake), and can have any suitable crystallographic orientation, crystallite size, interlayer spacing, density, particle size, or particle shape. The carbonaceous support can comprise a carbon selected from Ketjen Black, carbon black, lamp black, acetylene black, mesocarbon, graphite, pyrolytic graphite, single-wall carbon nanotubes, multi-wall carbon nanotubes, Vulcan carbon, and carbon fiber. In some embodiments, the carbonaceous support can have an average particle size of from 0.01 μm to 10 μm. The supported PtCu nanoparticles can also be disposed on a conductive substrate to provide an electrode.

As described above, the PtCu catalysts described herein can be used as electrocatalysts for the oxygen reduction reaction (ORR). The PtCu catalysts described herein can also be used as electrocatalysts for the oxidation of small molecule organic compounds, including alcohols such as methanol and ethanol, and carboxylic acids such as formic acid. As such, the PtCu catalysts described herein can be employed as catalysts at the anode, the cathode, or both the anode and the cathode of PEMFCs. Accordingly, also provided are fuel cells comprising an anode, a cathode, and an electrolyte membrane disposed between the anode and the cathode, wherein at least one of the anode and the cathode comprises an electrode comprising a population of the PtCu nanoparticles described herein disposed on a conductive substrate (e.g., the surface of an electrode, such as a carbon electrode). In certain embodiments, both the anode and the cathode of the fuel cell comprise an electrode comprising a population of the PtCu nanoparticles described herein disposed on a conductive substrate The PtCu catalysts described herein can also be active towards the oxygen reduction reaction to metal oxides, such as $LiO_2$ or $Li_2O_2$. As such, the PtCu catalysts described herein can be employed as catalysts at the cathode of metal air batteries (e.g., Li-air batteries, Mg-air batteries, Na-air batteries, or Zn-air batteries). Accordingly, also provided are metal-air batteries comprising a metal or metal-containing anode, a cathode, and an electrolyte dispose between the anode and the cathode, wherein the cathode comprises an electrode comprising a population of the PtCu nanoparticles described herein disposed on a conductive substrate.

The PtCu catalysts described herein can also be used in other catalytic applications. For example, the PtCu catalysts can also be used as electrocatalysts to drive the oxidation of small molecule organic compounds, including alcohols (e.g., to catalyze the oxidation of $C_1$-$C_{12}$ alcohols to aldehydes and ketones).

The examples below are intended to further illustrate certain aspects of the methods and compositions described herein, and are not intended to limit the scope of the claims.

EXAMPLES

Overview

One of the key technical challenges in polymer electrolyte fuel cells is improving both the activity and stability of oxygen reduction reaction (ORR) catalysts present at the cathode. Pt-based alloys have shown promise in achieving targets for oxygen reduction reaction catalyst activity as established by the U.S. Department of Energy. Highly active and stable PtCu catalysts with a consistently reproducible specific activity of up to 2124 $\mu A/cm^2$ Pt, sustainable with <10% loss in overall activity and electrochemical surface area up to 10,000 cycles were prepared by galvanically displacing a porous Cu support with Pt.

Materials and Methods

Fabrication of Porous Carbon Supports

A CuAl alloy containing 83 atomic percent (at %) aluminum and 17 at % copper was prepared from bulk 99.9% purity metals at The Ohio State University Solidification and Metal Casting Laboratories (OSU foundry). The alloy was cut into 24 mm diameter×2 mm thick 'coins'. The porous Cu support was then created by etching CuAl alloys in 6 M NaOH, at 80° C. for 16 hours, followed by continuous rinsing in ultrapure water over 2 hours to remove residual solvent and byproducts. The porous Cu support was subsequently dried, and stored in a desiccator soon after preparation. The absence of Al in the final porous support was confirmed by energy-dispersive X-ray spectroscopy (EDX) and X-ray photoelectron spectroscopy (XPS) (negligible signals below the detection limit). Prior to its use as an ORR catalyst support, the porous copper support was heated in $H_2$ atmosphere for 2 hrs at 450° C. to ensure the reduction of any formed Cu oxides to Cu metal.

Electrode Preparation

Following heat treatment of the porous copper support in $H_2$ the reduced copper coin was ground into a fine powder using a mortar and pestle. Electrodes were then fabricated that would contain, upon subsequent processing, either unsupported or carbon-supported PtCu catalysts.

Electrodes that would contain unsupported PtCu catalysts were prepared by dispersing 15 mg of the powdered porous copper support ultrasonically in 10 mL of ultrapure $H_2O$ for 10 minutes. 40 µL of a diluted NAFION® solution (sulfonated tetrafluoroethylene-based fluoropolymer-copolymer; 5 wt %; Alfa Aesar) was added to the dispersion of the powdered porous copper support. The resulting solution was sonicated for another 10 min. Immediately following sonication, 20 µL of the suspension was drop-casted onto a polished glassy carbon (GC) disk electrode (Pine, 5 mm diameter). The prepared electrode was dried under vacuum at ~55° C. for 1.5 hours. After drying, the coated electrode was allowed to cool down to room temperature.

Electrodes that would contain carbon-supported PtCu catalysts were prepared by dispersing 7.5 mg of the powdered porous copper support and 7.5 mg carbon (Vulcan XC-72) ultrasonically in 10 mL of ultrapure $H_2O$ for 10 minutes. The electrodes were then prepared using the procedure described above for the electrodes that would contain unsupported PtCu catalysts.

For purposes of comparison, electrodes containing 20 wt % Pt/C (Alfa Aesar) were prepared by dispersing the 15 mg Pt/C in 10 mL of ultrapure $H_2O$ for 10 minutes. The electrodes were then prepared using the procedure described above for the electrodes that would contain unsupported PtCu catalysts.

Before each experiment, each glassy carbon electrode was polished to a mirror-finished surface at 500 rpm using 1.0, 0.3 and 0.05 um alumina micropolish (Buehler) successively on a microcloth PSA (Buehler) for 2-10 min, then washed by rinsing in water and methanol and ultrasonication (20 s) with deionized water 3× to obtain a clean, fresh surface.

Platinum Deposition 120 mL of a 1.2 mM or 0.12 mM $K_2PtCl_4$ (Sigma-Aldrich) solution (ultrapure $H_2O$ from Milli-Q 18.2 MΩ) was added to a standard 3-electrode cell with heating jacket. Depending on the deposition, the cell was thermostatically controlled between 5 and 60° C. The GC electrode containing either the unsupported or carbon-supported porous copper support was attached to a Pine electrode rotator and immersed in the $K_2PtCl_4$ solution for 1-60 minutes. To ensure uniform deposition of platinum, the electrode was rotated at 500 rpm during deposition. This resulted in convection of the $K_2PtCl_4$ solution contacting the electrode surface Immediately after the timed deposition, the electrode was removed from the platinum solution and rinsed in 200 mL of ultrapure water for 2 minutes at 500 rpm, twice, to quench the reaction.

Electrochemical Study

Electrochemical measurements were performed in a jacketed standard 3-electrode cell using a ring-disk electrode (PINE) equipped with a PINE bi-potentiostat (PINE Wave-Driver) capable of concurrent rotation control. A reversible hydrogen electrode (RHE) with a luggin capillary was used as the reference electrode for all electrochemical measurements. The counter electrode was a Pt mesh. The electrolyte used was 0.1 M $HClO_4$, which was prepared by diluting concentrated trace metal grade acid (Fisher) with 18 Mohm ultrapure de-ionized $H_2O$ (Millipore). All cyclic voltammograms were recorded at 298K with a scan rate of 10-100 mV $s^{-1}$ and a rotation rate of 0 to 1600 rpm. The prepared electrodes were transferred to the electrochemical cell and immersed in nitrogen-saturated electrolyte, deareated for at least 45 min. The electrodes were 'primed' (i.e., conditioned) via electrochemical dealloying using a modification of the method first described by Koh et al. See, Koh et al. *J. Am Chem. Soc.* 2007, 129:12624-12646. The potential was cycled 50 times between 0.5 V and 1.2 V to dealloy/stabilize the catalyst. Cyclic voltametry (CV) scans (0 V-1.2 V) were then obtained to verify that a steady state voltammogram. The Pt electrochemical surface area (Pt ECSA) was determined from a $N_2$-saturated voltammogram via the average integrated charge of the underpotentially deposited hydrogen ($H_{upd}$) region (0.05 V to 0.40) after double-layer correction. The widely accepted conversion of 210 $\mu C\ cm^{-2}$ Pt for polycrystalline Pt was assumed. ORR CV measurements were performed in an oxygen-saturated electrolyte with the potential cycled between 0.0 V and 1.2 V. Kinetic ORR activity was calculated for the anodic sweep via the following relationship:

$$i_k = \frac{i_{lim} i_{tot}}{i_{lim} - i_{tot}}$$

Pt specific activities were determined from Pt-ECSA data as follows:

$$i_{Pt} = \frac{i_k}{PtECSA}$$

Electrochemical impedance spectroscopy (EIS) was used to determine the solution resistance for the electrochemical system to correct for IR loss using a Princeton Applied Research 263A potentiostat in conjunction with a Solartron 1260 Impedance Analyzer. The impedance was measured at OCP and at 0.9 V (amplitude of 5 mV from 10,000 Hz to 0.01 Hz). The correction was applied to raw data as follows:

$$E_{real} = E_{measured} - E_{IR}$$

An accelerated half-cell degradation test was performed by cycling the potential between 0.6 and 1.1 V at 50 mV/s in 0.1 M $HClO_4$ for 30,000 cycles under continuous $O_2$ flow. Cyclic voltammograms (0 V-1.2 V, 10 and/or 100 mV/s) were obtained intermittently (every 2500 cycles until 10,000 cycles; after, every 5000 cycles) to measure the Pt ECSA.

Catalyst Characterization

Pt and Cu content of the catalyst before and after ORR experiments are quantified using a Perkin-Elmer Sciex Elan 6000 ICP-MS. PtCu/C catalysts coated on GC electrodes were dissolved in aqua regia (3 HCl:1 $HNO_3$) for 24 hours and diluted with deionized water for ICP-MS measurements. Catalysts loading and mass activity are reported based on mass of the catalysts on the electrode as obtained from ICP-MS measurements.

Specific surface area, $S_{BET}$, was determined by measuring a volume of nitrogen adsorbed onto a specific mass of each sample as a function of gas pressure using a Quantachrome Autosorb iQ2 instrument. All samples were degassed before analysis at 100° C. for 6 hr to remove any physically adsorbed species.

Morphology and size of the catalysts were studied using a scanning electron microscope (SEM; FEI Sirion XL 30 or FEI Helios Nanolab 600) and a transmission electron microscope (TEM; FEI Tecnai F20), both fitted with an energy dispersive X-ray (EDX) detector.

X-ray photoelectron spectrum (XPS) studies were collected on an Axis 165 (Kratos) under a base pressure of $1 \times 10^{-8}$ Pa. The photoelectron spectra were excited using an Al Kα radiation (hν=1486.6 eV) with a total instrumental resolution of ~1 eV. Take-off angle of the electron is at 0° with respect to the surface normal. Fixed analyzer transmission (FAT) mode was used with the analysis area of 600 μm. The spectrometer's work function was calibrated using a linear regression of cleaned metallic Ag, Au and Cu. The C 1s line of the adventitious carbon at 285.0 eV was used as internal standard to calibrate the binding energies (BE). Survey scans (0-1400 eV) were collected at pass energy of 80 eV. Cu 2p, O 1s and C 1s XPS spectra were recorded at pass energy of 20 eV. The accuracy of the BE's measured was ±0.1 eV. Samples could be cleaned by argon sputtering (5 keV, 50 μA). The photoelectron spectra were corrected by subtracting a Shirley-type background and were quantified using the peak area and Scofield's photo-ionization cross sections. CasaXPS software (version 2.3.16) provides a least-square fit of a product of Gaussian and Lorentzian peaks. GL (30), which consists of 30% Lorentzian, is used for all peak quantification.

Results and Discussion

The deployment of proton exchange membrane fuel cells (PEMFCs) is limited by the high cost and low durability of catalysts. Currently, most of the energy loss in PEMFCs is at the cathode, due to the high energy barrier of the oxygen reduction reaction (ORR) process. Despite vast efforts in the past decades to develop non-Pt based catalysts for low temperature PEMFCs, Pt remains the catalysts of choice for ORR in acidic medium.

The surface electrochemistry of PtX alloys, typically involving 3d-transition metals (X=Fe, Ni, Co, Cu) is of interest due to the enhanced surface activity of these alloys towards the electrochemical reduction of $O_2$ (ORR) as compared to polycrystalline Pt. By modifying the surface activity of Pt through deposition on a porous copper support, stable ORR catalysts that can sustain high activities over extended periods of time are reproducibly generated. Specific ORR activities for the PtCu catalysts are over 70% more active than the high surface area Pt black (25-30 $m^2/g$ from Johnson Matthey) and are ~1.5× greater than the U.S. Department of Energy target for 2017 (see FIG. 1). PtCu catalyst synthesis involves the galvanic displacement of Pt onto a porous copper support. The properties of the porous Cu support, including surface area, are highly tunable (see FIG. 2a). The specific ORR activity of the PtCu catalyst can be enhanced by varying parameters of Pt deposition. The overall procedure does not require high heat, therefore particle growth due to Ostwald ripening can be minimized if desired. Also, no stabilizing ligands or surfactants need be used throughout the process.

Figure 2A:
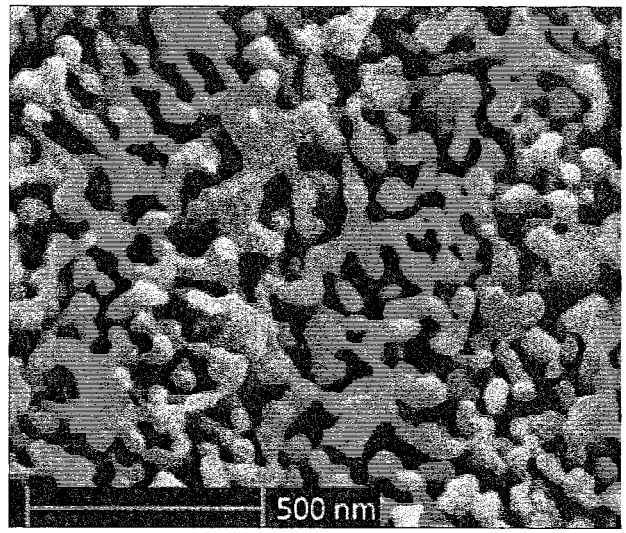
FIG. 2A is an SEM image of the porous Cu support prior to Pt displacement. The porous structure is relative uniform, with a ligament size of 60-100 nm. BET measurements gave an average surface area of 15 m$^2$/g.
Figure 2B:
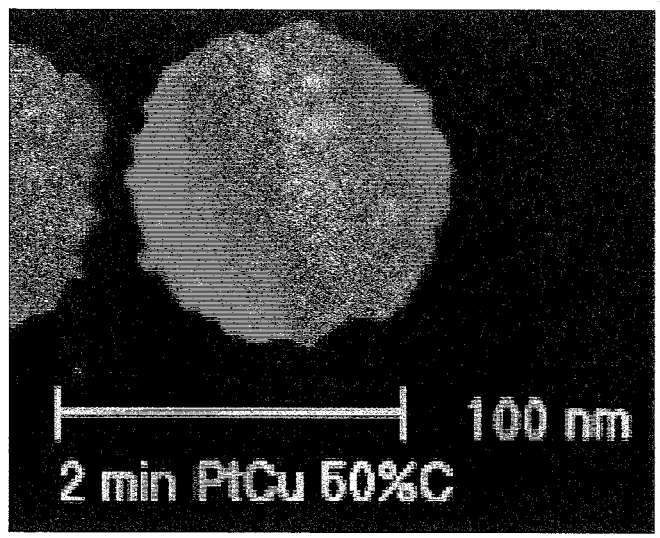
FIG. 2B is an SEM image of the carbon-supported PtCu catalyst (50% by weight carbon support) following Pt displacement (2 minute galvanic displacement time, performed at 50° C.). The PtCu catalyst has an average particle size of 80 nm, with particle sizes ranging from 50 nm to 120 nm, as determined by scanning electron microscopy and transmission electronic microscopy.
Figure 2C:
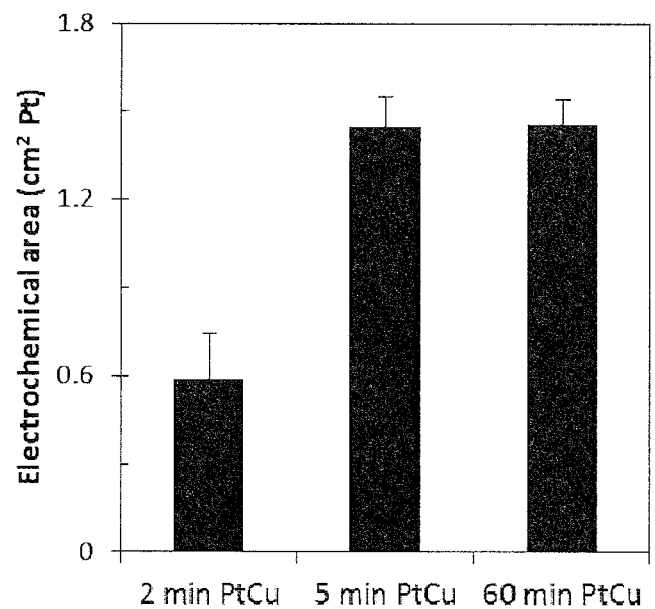
FIGS. 2C and 2D are plots of the electrochemical surface area (in cm$^2$ Pt.
Figure 2D:
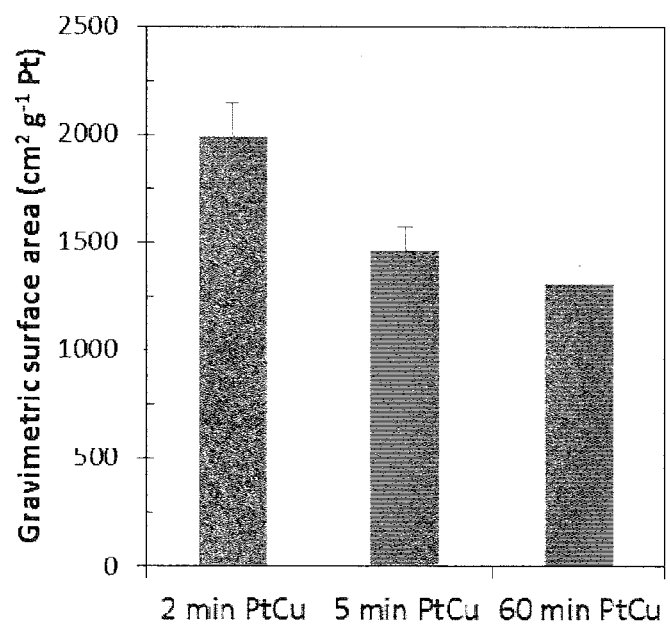

As shown in FIG. 1, the final ORR activity of the PtCu catalyst can be influenced by variables during catalyst formation, including the concentration of $K_2PtCl4$ used during galvanic displacement, the amount of time the porous copper support is contacted with the $K_2PtCl_4$ precursor, and the temperature during galvanic deposition. As shown in FIGS. 2C and 2D, the amount of Pt deposited reaches saturation after approximately 5 minutes of deposition to approximately 20 $m^2$ Pt/g Pt, at which point no further significant increase in the total electrochemical surface area (ECSA) is observed. This was also confirmed by Inductively Coupled Plasma-Mass Spectrometry (ICP-MS), which demonstrated that the Pt:Cu ratio reaches a maximum of about 2.2 after 10 minutes of galvanic deposition.

Figure 3A:
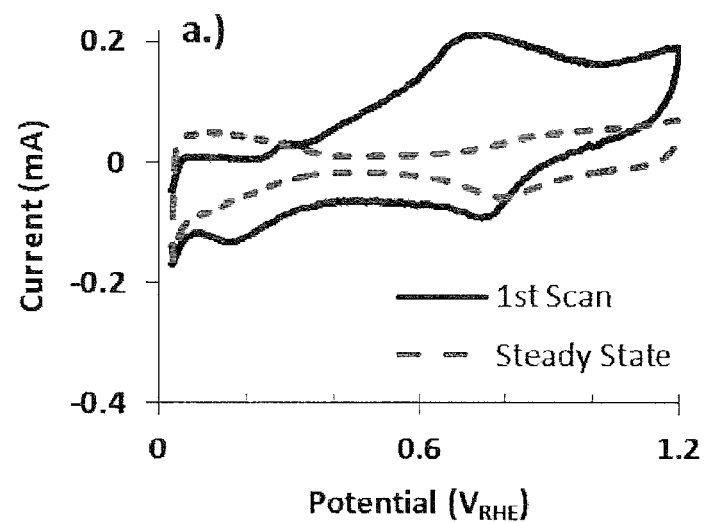
FIG. 3A is a cyclic voltammogram of galvanically displaced PtCu catalyst (2 minute galvanic displacement time, performed at room temperature) prior to conditioning (PtCu precursor catalyst; solid trace) and following conditioning (dashed trace). The CVs were measured in $N_2$-saturated 0.1 M $HClO_4$ at 25° C.; 100 mV/s.
Figure 3B:
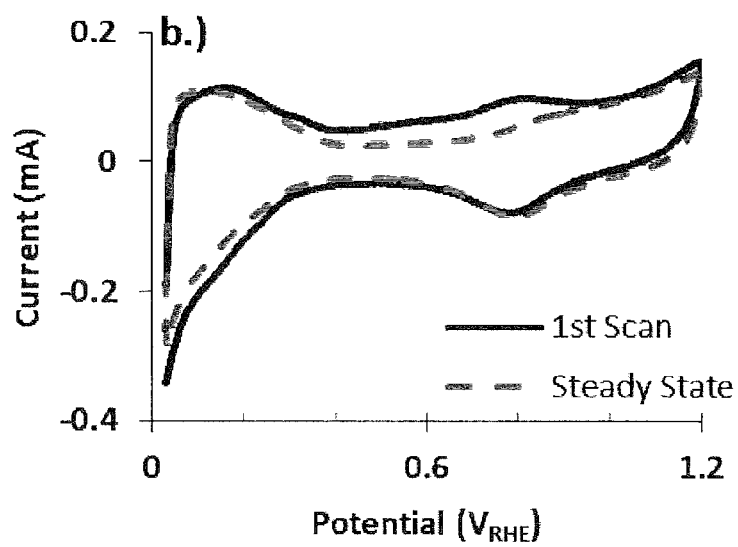
FIG. 3B is a cyclic voltammogram of galvanically displaced PtCu catalyst (3 minute galvanic displacement time, performed at 50° C.) prior to conditioning (PtCu precursor catalyst; solid trace) and following condition (dashed trace). The CVs were measured in $N_2$-saturated 0.1 M $HClO_4$ at 25° C.; 100 mV/s.
Figure 3C:
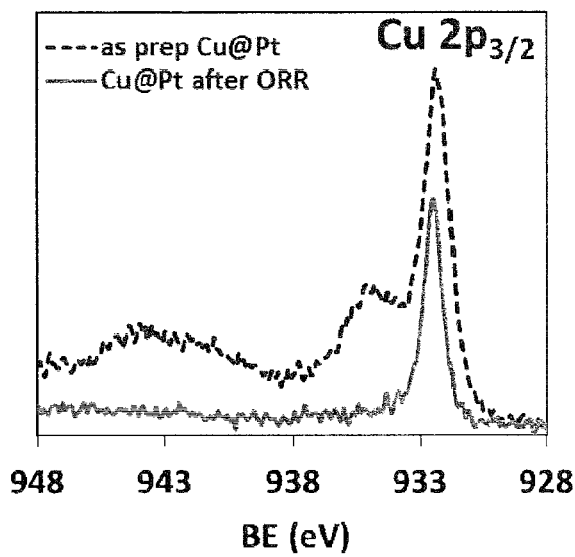
FIG. 3C shows the Cu $2p_{3/2}$ XPS spectra of galvanically displaced PtCu catalyst (2.5 minute galvanic displacement time, performed at room temperature) prior to conditioning (PtCu precursor catalyst; dashed trace) and following conditioning (solid trace).

Following galvanic deposition, the PtCu catalyst contained exposed Cu, the amount of which varied based on the deposition conditions (see FIGS. 3A-3C). XPS data also confirmed the presence of Cu (932.7 eV) and CuO (935.3 eV and shake up peaks between 940-945 eV, on the surface of as-formed PtCu catalyst (see FIG. 3C). Residual surface Cu layers were oxidized and removed, or dealloyed prior to using the PtCu catalyst, by cycling between 0.5 to 1.2 V at 1000 mV/s for 50 cycles. ORR catalysis was performed after the PtCu catalyst achieved a steady state Pt signature in $O_2$ free electrolyte (FIGS. 3A and 3B). Although detectable Cu metal was still observed at the near surface region of the PtCu catalysts from Cu $2p_{3/2}$ XPS, these observations are consistent with a PtCu catalyst that includes an active surface comprising Pt surrounding a Pt—Cu core.

Figure 4:
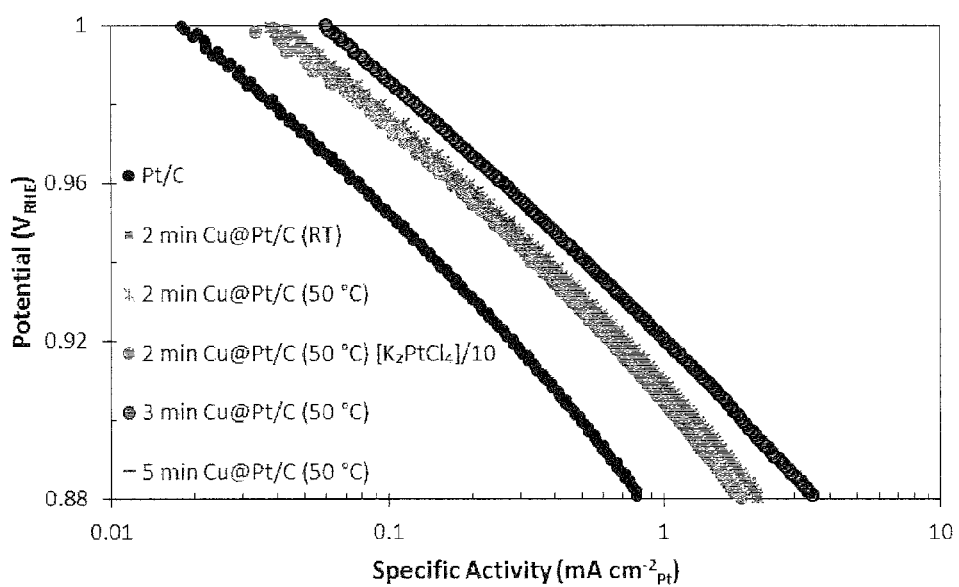
FIG. 4 is a Tafel plot of the oxygen reduction reaction catalyzed using four representative PtCu catalysts, some of which are supported on 50 wt % carbon (Vulcan XC-72). A Tafel plot of the oxygen reduction reaction catalyzed using Pt on carbon (Pt/C) is also included for comparison. Electrochemical measurements were performed at 25° C. in $O_2$-saturated 0.1 M $HClO_4$ at 100 mV/s.

The electrocatalytic activity of the PtCu catalysts for ORR was demonstrated by the anodic sweep in $O_2$-saturated electrolyte using a rotating ring-disc electrode. The kinetically controlled region (1.0 to 0.8 V) of the ORR (FIG. 4) gave a Tafel slope of approximately 60 mV/decade of current, suggesting an oxygen dissociation rate limiting step of an adsorbed $O_2^-$ species which is further reduced to $H_2O$. The corresponding ring data confirmed an overall 4-electron conversion of $O_2$ to $H_2O$, as evidenced by the absence of $H_2O_2$ between 0.5 and 1.2 V. $H_2O_2$ observed at potentials negative of 0.4 V was attributed to the preferential adsorption of hydrogen in this region, weakening the O—O dissociation and resulting in $H_2O_2$ formation.

Figure 5A:
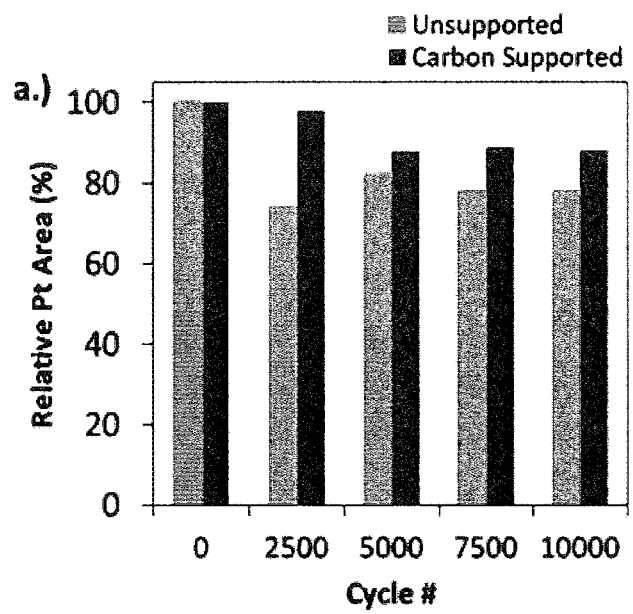
FIGS. 5A and 5B are plots illustrating the stability of carbon-supported (black bars) and unsupported (grey bars) PtCu catalysts (2.5 minute galvanic displacement time, performed at 50° C.). The accelerated stability test was performed by cycling potential between 0.6-1.1 V (RHE) in oxygen-saturated 0.1 M $HClO_4$ at 25° C.
Figure 5B:
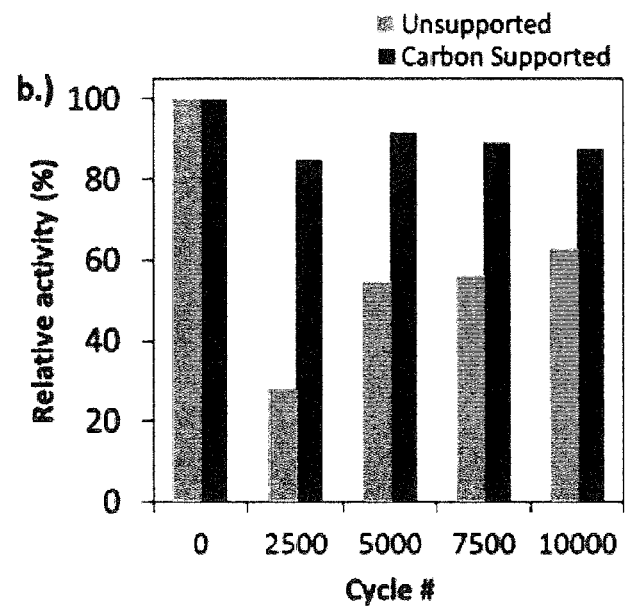

The ORR activity of the PtCu catalysts were measured and compared at 0.9 V. The potential was measured and reported against a reversible hydrogen electrode (RHE) and the IR-drop between the reference and working electrode was corrected using the high frequency intercept of a Nyquist plot obtained prior to the ORR sweep. Quantitative comparisons of the Pt-surface area-based specific activity ($\mu A/cm^2$ Pt), ICP-MS-determined mass activity (A/mg Pt), and stability (>10,000 cycles) of the PtCu ORR catalysts are included in FIGS. 1, 5A, 5B, and Table 1. The activity of the PtCu catalysts consistently exceeded the 2017 U.S. Department of Energy target of 720 $\mu A/cm^2$ Pt. The most active PtCu catalyst evaluated was formed using a 2.5 minute galvanic displacement time at 50° C. and 500 rpm in a 1.2 mM $K_2PtCl_4$ solution. This corresponded to a PtCu catalyst having a 1.6 Pt:Cu ratio (after ORR measurements), which exhibited a specific activity of 2124±186 $\mu A/cm^2$ Pt and a mass activity of 0.28 A/mg Pt at 0.9 $V_{IR\text{-}free}$. The PtCu catalyst exhibited a mass activity that was approximated 57% higher than the current state-of-the-art high surface area Pt black/C catalyst.

Catalyst stability was evaluated by cycling the potential between 0.6 and 1.1 $V_{RHE}$ in $O_2$-saturated 0.1 M $HClO_4$ for 10,000 cycles. After every 2500 cycles, the electrolyte was saturated with nitrogen, and the ECSA measured. The 2.5 min 50° C. deposited PtCu catalyst on a carbon support experienced a 10% loss in the ECSA during the first 5000 cycles, but experienced no further loss in ECSA during the next 5,000 cycles (see FIG. 5A). The 2.5 min catalyst also maintained 90% of its initial ORR activity over the 10,000 cycles (see FIG. 5B).

TABLE 1

Summary of the ORR activity of representative PtCu catalysts at 0.9 V.

| Catalyst | Pt Loading (μg)† | Mass Activity (A/mg Pt) | Specific Activity (μA/cm² Pt) |
|---|---|---|---|
| C-Supported PtCu (3 min, 50° C.) | 22.5 | 0.253 | 1695 |
| C-Supported PtCu (2.5 min, 50° C.) | 22.5 | 0.280 | 2124 |
| Unsupported PtCu (2 min, room temperature | — | 0.245 | 991 |
| Pt on carbon (Pt/C) | 30 | 0.178 | 984 |
| 2017 U.S. DOE Targets* | — | ≥0.44 | 720 |

†Pt loading was determined using ICP-MS.
*DOE targets for ORR activity are measured at 80° C. and 150 kPa $O_2$; ORR activity of the catalysts above was measured at 25° C. and 100 kPa $O_2$.

Figure 6A:
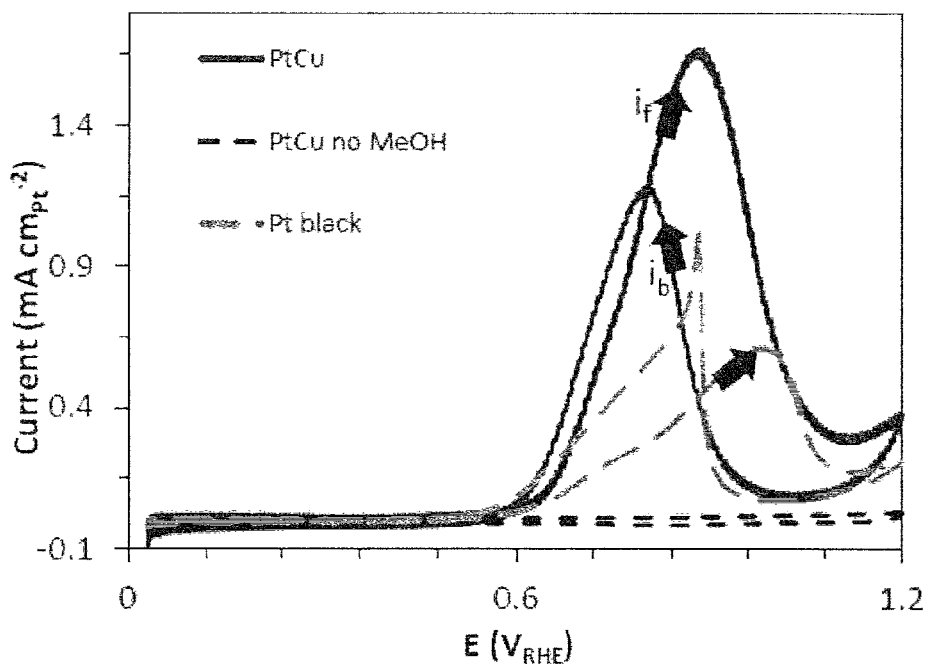
FIG. 6A shows the forward scans from cyclic voltammograms of a PtCu catalyst (solid trace) and Pt on carbon (Pt/C; dashed grey trace) in the presence of 0.5 M methanol in deoxygenated ($N_2$-saturated) 0.1 M $HClO_4$; 10 mV/s; 1600 rpm. $i_f/i_b$ provides a measure of the activity of the catalyst towards methanol oxidation. The cyclic voltammogram of the PtCu catalyst in the absence of methanol is also plotted for comparison (dashed black trace).
Figure 6B:
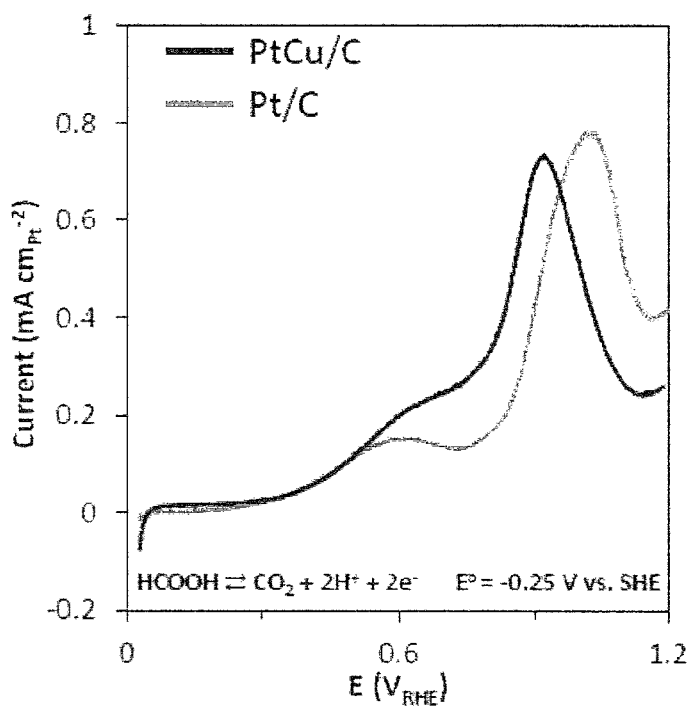
FIG. 6B shows the forward scans from cyclic voltammograms of a carbon-supported PtCu catalyst (dark grey trace) and Pt on carbon (Pt/C; light grey trace) in the presence of 0.5 M formic acid in deoxygenated ($N_2$-saturated) 0.1 M $HClO_4$; 10 mV/s; 1600 rpm.
Figure 6C:
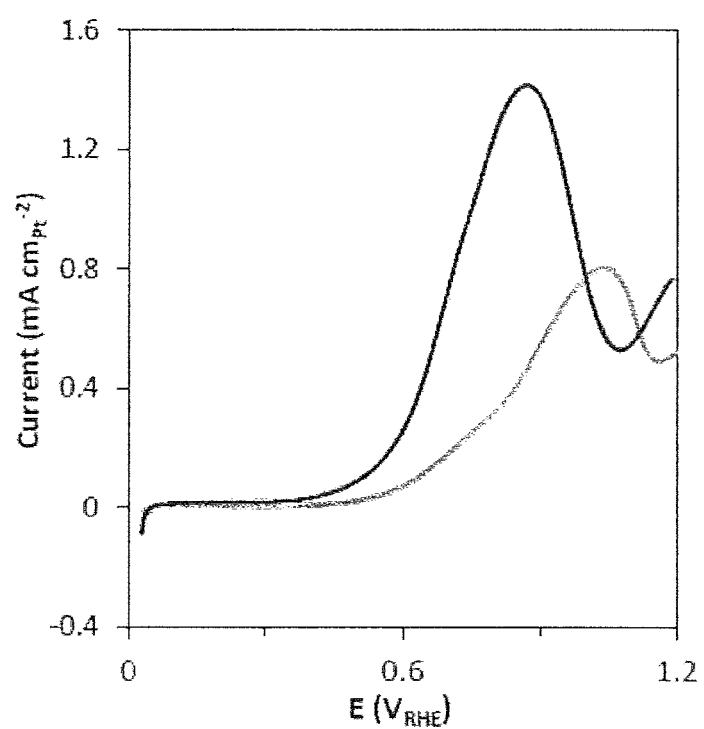
FIG. 6C shows the forward scans from cyclic voltammograms of a carbon-supported PtCu catalyst (dark grey trace) and Pt on carbon (Pt/C; light grey trace) in the presence of 0.5 M ethanol in deoxygenated ($N_2$-saturated) 0.1 M $HClO_4$; 10 mV/s; 1600 rpm.

Activity of PtCu Catalysts Towards Oxidation of Methanol, Ethanol, and Formic Acid Oxidation The electrocatalytic activity of the PtCu catalysts for formic acid, methanol and ethanol oxidation was demonstrated by the anodic sweep in the $N_2$-saturated acidic and alkaline electrolyte using a rotating ring-disc electrode. The acidic electrolyte is composed of 0.1 M $HClO_4$ and 0.5 M methanol (or ethanol or formic acid) and the alkaline electrolyte is composed of 0.1 M KOH and 0.5 M methanol (or ethanol or formic acid). The onset potential, current normalized to the Pt active area, as well as the ratio between the forward and reverse peaks were used as metric for comparing the oxidation reaction activity of the PtCu/C catalysts compared to the commercial Pt/C catalysts. As shown in FIGS. 6A-6C, the Pt/Cu catalysts exhibited oxidation reaction activity towards representative organic small molecules (e.g., alcohols and carboxylic acids).

CONCLUSIONS

These results demonstrate highly active and stable PtCu catalysts with a consistently reproducible ORR specific activity of up to 2.1 $mA/cm^2$ Pt, sustainable with <10% loss in overall activity and electrochemical surface area up to 10,000 cycles were prepared by galvanically displacing a porous Cu support with Pt. The nature of the enhanced activity of these catalysts as compared to other Pt-based catalysts for ORR may be due to the following contributions or combinations thereof: (a) lattice strain on the Pt layer; (b) the structural arrangement of Pt atoms present on the Pt—Cu particle interior, resulting in a change in the geometric structure of the Pt (i.e., Pt—Pt bond distance and coordination number); and (c) modifications of the electronic structure, affecting Pt—OH or Pt—O bond energetics. The PtCu catalysts are also active as catalysts for the oxidation of alcohols and carboxylic acids, including methanol, ethanol, and formic acid.

The compositions and methods of the appended claims are not limited in scope by the specific compositions and methods described herein, which are intended as illustrations of a few aspects of the claims. Any compositions and methods that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed. Other than where noted, all numbers expressing geometries, dimensions, and so forth used in the specification and claims are to be understood at the very least, and not as an attempt to limit the application of the doctrine of equivalents to the scope of the claims, to be construed in light of the number of significant digits and ordinary rounding approaches.

Unless defined otherwise, all technical and scientific terms used herein have the same meanings as commonly understood by one of skill in the art to which the disclosed invention belongs. Publications cited herein and the materials for which they are cited are specifically incorporated by reference.

What is claimed is:

1. A population of platinum-copper (PtCu) nanoparticles comprising a
   (a) a particle interior comprising platinum and copper; and
   (b) a surface layer comprising platinum surrounding the particle interior,
   wherein the nanoparticles have an average particle size of from 60 nm to 500 nm, as determined by scanning electron microscopy (SEM).

2. The nanoparticles of claim 1, wherein the population of nanoparticles is monodisperse.

3. The nanoparticles of claim 1, wherein the molar ratio of Pt:Cu in the nanoparticles is from 0.5:1 to 3:1, as determined by Inductively Coupled Plasma-Mass Spectroscopy (ICP-MS).

4. The nanoparticles of claim 1, wherein the nanoparticles exhibit a Pt electrochemical surface area of at least 10 $m^2$ Pt/g Pt.

5. The nanoparticles of claim 1, wherein the nanoparticles exhibit an $O_2$ reduction ICP-MS-determined, internal resistance-corrected (IR-corrected), mass activity at 0.9 $V_{RHE}$ of at least 0.2 A/mg Pt, measured at 25° C. and 100 kPa O2 in 0.1 M $HClO_4$.

6. The nanoparticles of claim 1, wherein the nanoparticles exhibit an $O_2$ reduction Pt-surface area-based, IR-corrected, specific activity at 0.9 $V_{RHE}$ of at least 750 $\mu A/cm^2$ Pt, measured at 25° C. and 100 kPa $O_2$ in 0.1 M $HClO_4$.

7. The nanoparticles of claim 1, wherein the nanoparticles exhibit less than a 30% reduction in Pt electrochemical surface area following 10,000 cycles between a potential of 0.6 and 1.1 $V_{RHE}$ in $O_2$-saturated 0.1 M $HClO_4$ at 25° C.

8. The nanoparticles of claim 1, wherein the nanoparticles exhibit less than a 50% reduction in $O_2$ reduction ICP-MS-determined, IR-corrected, mass activity at 0.9 $V_{RHE}$, measured at 25° C. and 100 kPa $O_2$, following 10,000 cycles between a potential of 0.6 and 1.1 $V_{RHE}$ in $O_2$-saturated 0.1 M $HClO_4$ at 25° C.

9. An electrode comprising the nanoparticles defined by claim 1 disposed on a conductive substrate.

10. The electrode of claim 9, further comprising a carbonaceous support.

11. A fuel cell comprising an anode, a cathode, and an electrolyte membrane disposed between the anode and the cathode, wherein at least one of the anode and the cathode comprises an electrode defined by claim 9.

12. A metal-air battery comprising a metal or metal-containing anode, a cathode, and an electrolyte dispose between the anode and the cathode, wherein the cathode comprises an electrode defined by claim 9.

* * * * *